Dec. 27, 1960
T. W. DRURY
2,966,278
METERING CONTROL DEVICE
Filed Feb. 13, 1958
3 Sheets-Sheet 1
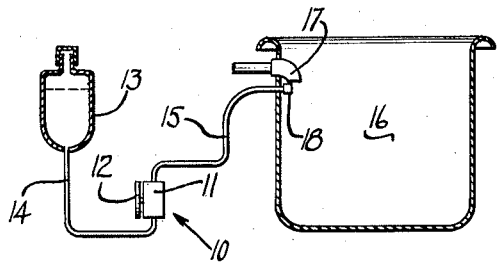
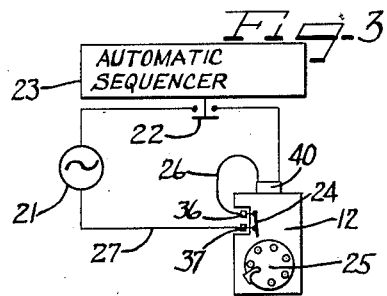
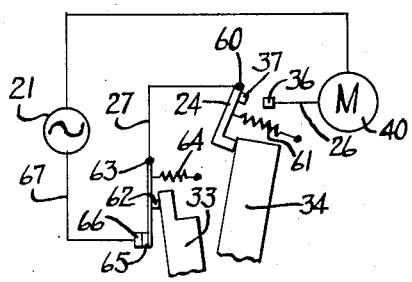
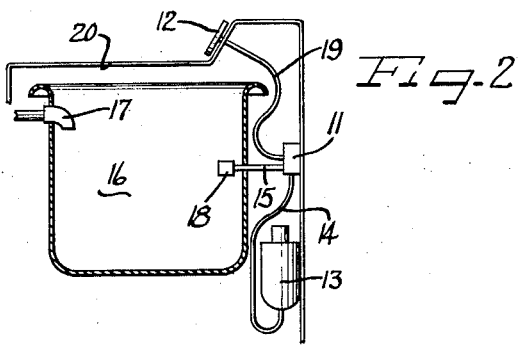
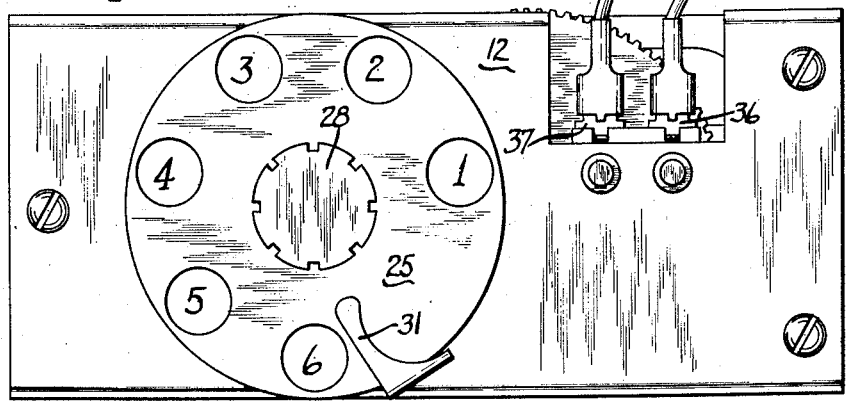
Inventor
Thomas W. Drury

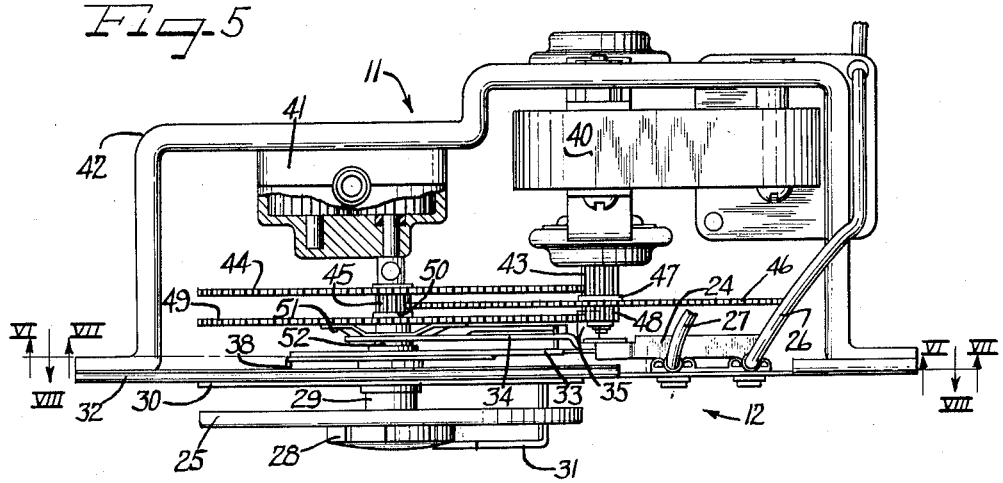
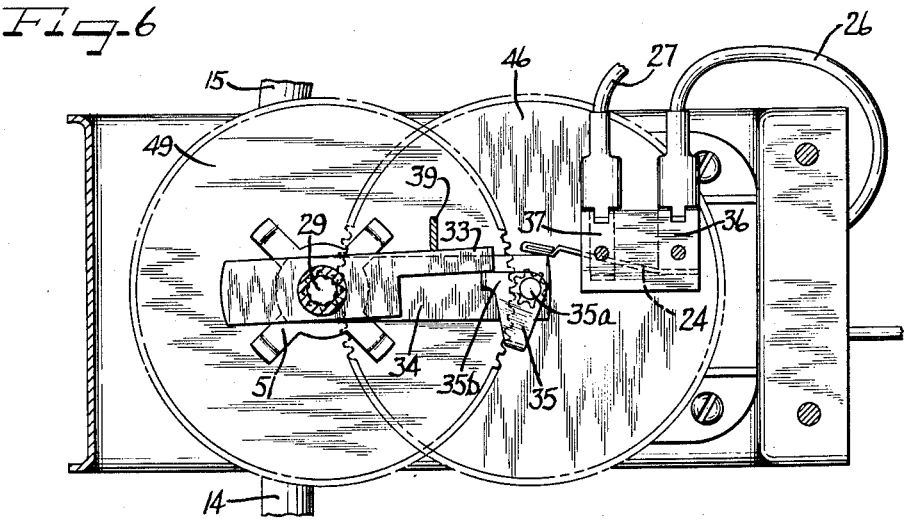

Dec. 27, 1960 T. W. DRURY 2,966,278
METERING CONTROL DEVICE
Filed Feb. 13, 1958 3 Sheets-Sheet 3

Inventor
Thomas W. Drury
by Hill, Sherman, Meroni, Gross & Simpson Attys

United States Patent Office 2,966,278
Patented Dec. 27, 1960

2,966,278
METERING CONTROL DEVICE

Thomas W. Drury, Bronson, Mich., assignor to Kingston Products Corporation, Kokomo, Ind., a corporation of Indiana Filed Feb. 13, 1958, Ser. No. 715,137

9 Claims. (Cl. 222—70)

This invention relates to a control device for metering the cycles of operation of a material handling or processing apparatus. More particularly, this invention relates to a device for controlling the time or duration of operation of, and hence the quantity of material handled by a pump which may be used to provide a controlled amount of water, soap, or other pumpable water additives in an automatic washing machine of the type used for household washing.

It is necessary or desirable in many types of apparatus to provide a mechanism by which the operator may select a predetermined quantity of material to be automatically dispensed or otherwise processed by the apparatus. In automatic washing machines of the type adapted for household use, for example, it is desirable to provide a control device which may be easily set by the operator to control the metering of a predetermined amount of a liquid soap or other pumpable water additives to the wash water at a predetermined time in the automatically controlled sequence of operation of the machine. From a practical point of view, the operation of adjusting such a device to select a desired quantity should be as simple as possible so as to be readily understandable to any member of the using public. Furthermore, the device should be such that it can be adjusted at any time before the operation of the controlled mechanism during the sequence of operation of the apparatus and its mechanical operation should be relatively simple and foolproof.

It is therefore an object of this invention to provide a metering control device adapted for use in apparatus such as a household washing machine.

It is a further object of this invention to provide a control device which is adapted for use in an automatic washing machine and which may be easily and simply adjusted to control the metering of a predetermined quantity of pumpable material.

It is a still further object of this invention to provide such a device the adjustment of which is simple and readily understandable and the operation of which is mechanically simple and foolproof.

Briefly, in accordance with one aspect of this invention, the motor driving a pump handling the material to be metered is also connected through reduction gearing to drive a geared timing disk.

A telephone type dial is connected to control the position of a control member positioned on the timing disk by a ratchet when a given number corresponding to the quantity of material desired is dialed. When the motor is started under the control of the main automatic sequencing unit of the apparatus, the operation of the motor will run the pump and concurrently rotate the timing disk until the control member reaches a position at which it opens a normally closed switch and breaks the electrical circuit to the motor. Opening of this switch stops the operation of the motor, the pump, and the timing means. The quantity of material pumped is thus controlled by the time of operation of the motor which in turn is controlled by the position or setting of the control member as determined by the number dialed on the telephone type switch.

While the novel and distinctive features of the invention are particularly pointed out in the appended claims, a more expository treatment of the invention, in principle and in detail, together with additional objects and advantages thereof, is afforded by the following description and the accompanying drawings in which:

Figure 1 is a schematic view showing the location of the control device in a washing machine system;

Figure 2 is a schematic view similar to Figure 1 but showing an alternate arrangement of the device in a washing machine system;

Figure 3 is a schematic electrical circuit diagram of the metering device;

Figure 4 is a front elevational view, partly broken away, showing the control panel of the device;

Figure 5 is a partly broken away top view of the control device shown in Figure 4;

Figure 6 is a sectional view taken on the line VI—VI of Figure 5;

Figure 9 is a schematic electrical circuit diagram of an alternate embodiment of the invention.

Figure 7:
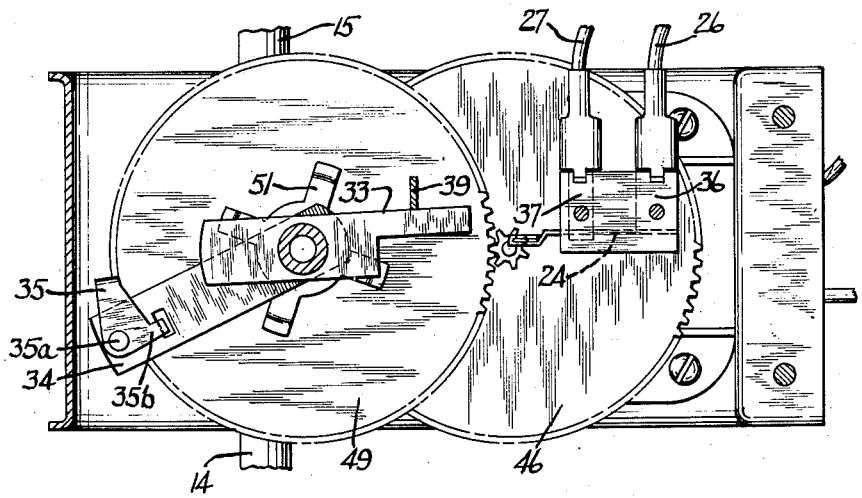
Figure 7 is a sectional view taken on the line VII—VII of Figure 5.
Figure 8:
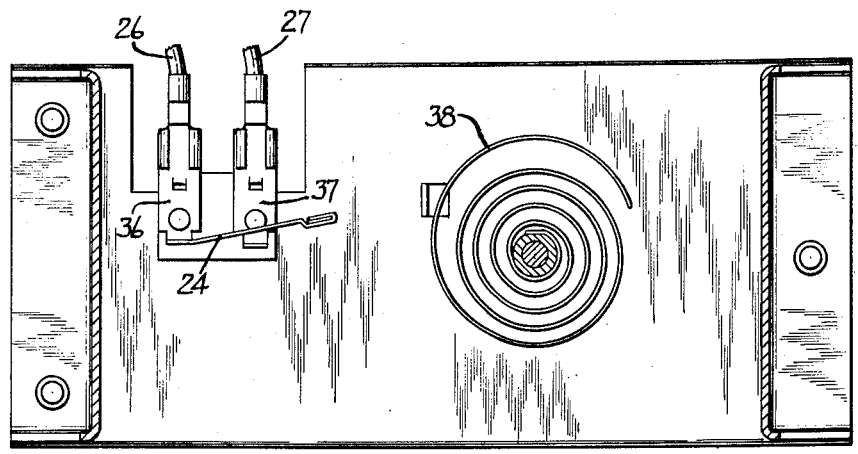
Figure 8 is a sectional view taken on the line VIII—VIII of Figure 5.

Turning now to the drawings and in particular to Figure 1 thereof, there is schematically shown a metering control device 10 including a motor-pump portion 11 and a control panel 12. A container or reservoir 13 containing soap, fluffier, or other water additive to be pumped is connected by a conduit 14 to the inlet of the motor-pump assembly 11 which in turn is connected by a conduit 15 to the washing tub 16 of an automatic washing machine. Water is supplied to the tub 16 from a main water inlet 17 whereas conduit 15 terminates in inlet 18 adapted to add soap or other water additive.

In Figure 2 there is illustrated a slightly modified arrangement of the system shown in Figure 1. Like reference characters have been used to indicate like parts in Figures 1 and 2 and throughout the drawings. In Figure 2 the control panel 12 is mounted above tub 16 on a framework member 20 and is positioned remotely from the motor-pump assembly 11 which may conveniently be mounted in back of tub 16. A flexible shaft or other remote control means 19 may in such an arrangement be used to connect the control panel 12 with the motor-pump assembly 11.

In Figure 3 there is shown a schematic circuit diagram of the electrical circuit of the control device. A source of electrical power 21, which may conveniently be ordinary household line voltage, has one side connected through a switch 22 to one side of the motor 40 of motor-pump assembly 11. The other side of motor 40 is connected by conductor 26 to terminal 36 of a switch having a normally closed arm 24. Switch terminal 37 is connected by a conductor 27 back to the other side of the source of power 21.

The normally open switch 22 is closed by electromagnetic or any other convenient means under the control of an automatic sequencing unit 23 at the point of time in the overall sequence of operation of the apparatus at which it is desired to pump in soap or other water additive. Of course it will be understood that if the control device is used to control the pumping of water itself rather than a water additive, the sequencing unit would simply be readjusted to operate switch 22 and hence the control device at the appropriate point of the cycle. When switch 22 is closed by the automatic sequencing unit 23, a circuit is completed through the motor-pump unit 11 which operates until switch 24 is opened by a control member such as a bracket arm rotated by a timing gear in a manner to be described in greater detail below. This bracket arm is initially positioned by the operator at or near the beginning of the sequence of operation by the rotation of a telephone type dial 25 (shown in Figures 4 and 5) which leaves the bracket arm fixed in a predetermined position relative to the timing gear by means of a ratchet mechanism. The amount that the operator has chosen to rotate this dial will initially position the bracket arm and thereby determine how long it will take the bracket arm to be rotated by the gear to a position where it opens the switch 24 and stops the operation of motor 11. This in turn, of course, controls the amount of material pumped. Hence the simple operation of telephone type dial 25 by the operator controls the amount of material pumped from reservoir 13 into tub 16.

In Figure 4 there is shown a front elevational view of the control panel 12 upon which is mounted the telephone type dial 25 which is secured by a cap 28 to a shaft 29 as best seen in Figure 5. Dial 25 has the usual series of holes therein in back of which appear numbers such as 1, 2, 3, 4, 5 and 6 which are painted or otherwise printed on a plate 30 mounted in back of the dial. In order to set the control device to meter a predetermined amount of material to be pumped, the operator places a finger in one of the holes and rotates the dial until further rotation is prevented by a stop 31 which is affixed to a frame member 32. Rotation of dial 25 rotates shaft 29 to which the dial is rigidly attached by knob 28. This in turn rotates a pair of bracket arms 33 and 34 by virtue of the fact that arm 33, which is rigidly attached to shaft 29, releases ratchet mechanism 35 on bracket arm 34 and turns the latter until rotating force is removed from dial 25. Dial 25 and arm 33 are then returned to their initial positions by the action of a spring 38. The position of the bracket arms 33 and 34 after a cycle of operation of the device and before a new setting of the control dial is shown in Figure 6. The position of the bracket arms 33 and 34 after rotation of dial 25 as shown in Figure 7 is considered the normal state of the apparatus and corresponds to the electrical circuit diagram of Figure 3 in which the switch arm 24 closes the electrical circuit between contacts 36 and 37 to which conductors 26 and 27 are attached. The motor 40 will thus begin to operate as soon as switch 22 is closed by the automatic sequencer 23.

The detailed construction and operation of the mechanism may be seen more clearly from a consideration of Figures 5, 6, 7 and 8.

In Figure 5 a motor 40 and a pump 41 of the motor-pump assembly 11 are shown mounted on a bracket 42 in any conventional manner. The drive shaft 43 of motor 40 drives a gear disk 44 which in turn drives the gear pump 41 through a shaft 45 to which disk 44 is attached. Shaft 45 has gear teeth on its outer end which mesh with the teeth of a gear disk 46 which is free to rotate on a mounting member 47 and in turn drives a spline gear 48 to which disk 46 is attached. Spline gear 48 in turn drives the geared timing disk 49 which is free to rotate on a mounting member 50.

A spring member 51 is rigidly attached to arm 34 to maintain frictional contact between arm 34 and timing disk gear 49. Arm 34 is urged by spring 51 into frictional contact with an abutment 52 on the end of shaft 29. Spring 51 is adjusted so that it will slide over the surface of disk 49 when rotation of dial 25 and arm 33 release the ratchet mechanism 35 and turn arm 34. The spring maintains enough frictional contact, however, to prevent arm 34 from overrunning arm 33 before ratchet mechanism 35 locks arm 34 in the set position shown in Figure 7.

Ratchet member 35 is pivotally attached to arm 34 by a pin 35a and is provided on one edge with teeth which mesh with the teeth of gear disk 49 to thereby hold arm 34 in a fixed position relative to disk 49. When setting arm 33 bears against a flange 35b on ratchet 35, the ratchet member is pivoted about pin 35a so as to lift its teeth away from those of disk 49 and permit the arm to be rotated while disk 49 remains stationary. When the frictionally engaged arms 33 and 34 have thus been rotated from the position shown in Figure 6 until the arm 34 is in a position shown in Figure 7, the release of pressure on the arm 33 resulting from dial 25 being stopped by stop 31 permits the ratchet 35 to again engage the gear teeth of gear disk 49. The arm 33 is then returned to its original position by the coil spring 38 until the arm 33 strikes a stop 39.

The mechanism is then set to meter a predetermined quantity of material to be pumped in accordance with the time of operation determined by the setting of arm 34. When the arm 34 is in the position shown in Figure 7 it will be noted that the spring switch arm 24 completes or closes the circuit between contacts 36 and 37. Hence, when switch 22 is closed by the automatic sequencing unit 23, a circuit is completed through the motor 40 of the motor-pump assembly 11. The motor then drives both pump 41 and timing gear disk 49. The timing gear disk is of course driven through the chain of reduction gears 43, 44, 45, 46, 48, and thence to gear disk 49. The reduction ratio of this train of gears may for example be 1000 to 1. In this case, if the bracket arm 34 has been rotated through one-fourth of the total circumference of timing disk 49, then after 250 revolutions of motor 40, the arm 34 will move from the position shown in Figure 7 to that shown in Figure 6 in which the arm 34 lifts the spring switch arm 24 away from contact 37. This, of course, stops motor 40 and hence pump 41 and the mechanism is again ready to be reset by dial 25.

If it is desired to use the metering control unit 10 in a manual or semi-automatic installation which does not include the automatic sequencing unit 23 or switch 22 controlled thereby, it will be noted that switch 24 will be closed while the dial is being rotated to set the mechanism to control the amount of material to be pumped. The operation of the motor during the setting interval may be objectionable to some users and can readily be avoided by means of the circuit shown schematically in Figure 9 wherein like reference characters have been used to indicate parts shown in the previous figures. In Figure 9 one side of the source of power 21 is connected to one side of motor 40, the other side of which is connected to contact 36 of switch 24. Contact 37 is rigidly mounted on switch arm 24 which is schematically shown as being pivoted about a pivot 60 and being spring biased to the closed position by a spring 61. Switch 24 is held open by counterclockwise rotation of arm 34 as in the previous figures. Contact 37 is connected through switch arm 24 and a conductor 27 to another pivoted switch arm 62 which turns about a pivot 63 and is spring biased to an open position by a spring 64. As shown in Figure 9, contact 65, which is rigidly attached to spring arm 62, is held on contact 66 against the action of spring 64 by arm 33. Contact 66 is in turn connected back to the other side of the source of power 21 by a conductor 67 to complete the circuit to motor 40.

The position of the arms shown in Figure 9 corresponds to the position of the arms 33 and 34 shown in Figure 6. It will be noted that in effect the stop 39 shown in Figure 6 has been replaced by the switch 62 which is spring biased to an open position and is held closed by arm 33. The rest of the mechanism is of course the same as has been shown in the earlier figures. It will be apparent that when arms 33 and 34 are rotated by dial 25 to set the mechanism, switch 24 will close but switch 62 will open thereby preventing the motor from running during the setting interval. As soon as dial 25 is released, however, arm 33 is returned to the position shown in Figure 9 by the action of spring 38. Both switches 24 and 62 are then closed and the motor starts to run thereby turning the timing gear disk 49. This slowly returns the arm 34 back to the position shown in Figure 9 so that when the motor has operated for the desired predetermined period, switch 24 is again opened by arm 34 thereby breaking the motor circuit and stopping its operation.

It will of course be understood that the embodiment of the invention shown in the drawings is a preferred illustrative embodiment only and that many modifications therein could be made. For example, the telephone type dial 25 is preferred because of its familiarity to many housewives. It could however obviously be replaced by any type of knob attached to shaft 29 and setting arm 33. In certain types of apparatus, this arm could also be set electrically by a solenoid or by other electrical or mechanical means. The control device could also be provided with a push-button to release the ratchet 35 if the initial dial setting was wrong due to carelessness. Furthermore, as pointed out above, although the device has been illustrated as providing a metering control for a predetermined amount of soap or other water additive, a water vane wheel could also be geared to this type of control to dispense a fixed quantity of water.

It should also be understood that the word "time" as hereinabove used means the time of operation of any given motor operating at a predetermined number of revolutions per minute to pump a material of a given viscosity. The "time" may be expressed as the number of cycles of operation of the pump. The speed of operation of some motors may be affected by such factors as line voltage and of course the number of revolutions required to pump a given quantity of material depends upon the viscosity of the material as well as the capacity of the pump and speed of the motor. It is, of course, assumed that the source of operating power has relatively constant and known voltage characteristics and that the viscosity of the material to be pumped is at least approximately known so that the "time" of operation of the pump may be selected or calibrated in accordance with these factors to correspond to or determine any desired quantity of material.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

I claim as my invention:

1. In a washing machine, a wash tub, a pump connected to supply material to said tub, a motor connected to drive said pump, said motor also being connected to drive a timing member, an electrical circuit for supplying power to drive said motor, a first switch in series with said motor in said circuit, said first switch being spring-biased to a closed position, a control member, means adjustably connecting said control member to said timing member, said control member having a first position in which it holds said first switch open against the bias of said spring, setting means to move said control member from said first position to a pre-selected one of a plurality of other positions to permit said first switch to close, said setting means having a normal position adjacent to said first position of said control member, means to automatically return said setting member to said normal position after said control member has been moved from said first position, a second switch connected in series with said first switch in said electrical circuit, said second switch being spring-biased to an open position, said setting means holding said second switch closed against said spring bias only when said setting means is in said normal position, said timing member operating when both said switches are closed to return said control member to said first position to reopen said first switch after an interval of time having a length determined by the position to which said control member was moved by said setting means.

2. In a washing machine, a wash tub, a pump connected to supply material to said tub, an electrical motor connected to drive said pump, reduction gearing connecting said motor to drive a geared timing disk, an electrical circuit for supplying power to drive said motor, a switch in series with said motor in said circuit, said switch being spring-biased to a closed position, a control arm pivotally mounted to rotate about the axis of said timing disk, a ratchet member pivotally mounted on said control arm and having teeth which normally mesh with the teeth of said gear timing disk to hold said control arm in a fixed position relative to said timing disk, said control arm having a first position in which it holds said switch open against said spring-bias, a setting arm pivotally mounted coaxially with said control arm and being spring-biased to a first position adjacent to said first position of said control arm, means to rotate said setting arm through a preselected angle, said setting arm having a portion which bears against said ratchet member to release said ratchet and cause said control arm to rotate with respect to said timing disk when said setting arm is rotated, said ratchet member being spring biased to mesh with the teeth of said timing disk and hold said control arm in the position on said timing disk to which it is moved by said setting arm after said setting arm is spring returned to its first position, said timing disk being mounted to be rotated by said motor when said switch is closed to return said control arm to its said first position to reopen said switch and stop said motor after an interval of time the length of which is determined by the angle through which said setting arm was rotated.

3. In a washing machine, a wash tub, a pump connected to supply material to said tub, an electrical motor connected to drive said pump, reduction gearing connecting said motor to drive a geared timing disk, an electrical circuit for supplying power to drive said motor, a first switch in series with said motor in said circuit, said first switch being spring-biased to a closed position, a control arm pivotally mounted to rotate about the axis of said timing disk, a ratchet member pivotally mounted on said control arm and having teeth which normally mesh with the teeth of said geared timing disk to hold said control arm in a fixed position relative to said timing disk, said control arm having a first position in which it holds said first switch open against said spring bias, a second switch connected in series with said first switch in said electrical circuit, said second switch being spring biased to an open position, a setting arm pivotally mounted coaxially with said control arm and being spring biased to a first position adjacent to said first position of said control arm, said setting arm holding said second switch closed against said spring bias when said setting arm is in said first position, means to rotate said setting arm through a preselected angle, said setting arm having a portion which bears against said ratchet member to release said ratchet and cause said control arm to rotate with respect to said timing disk when said setting arm is rotated, said ratchet arm being spring biased to mesh with the teeth of said timing disk and hold said control arm in the position on said timing disk to which it is moved by said setting arm after said setting arm is spring returned to its said first position, said timing disk being mounted to be rotated by said motor only when both said switches are closed to return said control arm to its said first position to reopen said first switch and stop said motor after an interval of time the length of which is determined by the angle through which said setting arm was rotated.

4. In an automatic washing machine, a wash tub, a pump connected to supply material to said tub, an electrical motor connected to drive said pump, an electrical circuit for supplying power to operate said motor, a first normally open switch in series with said motor in said circuit, an automatic sequencing unit connected to close said switch at a predetermined time, a second switch connected in series with said first switch in said circuit, said second switch being spring-biased to a closed position, a geared timing disk connected to be driven by said motor, a control arm pivotally mounted to rotate about the axis of said timing disk, a ratchet member pivotally mounted on said control and having teeth which normally mesh with the teeth of said geared timing disk to hold said control arm in a fixed position relative to said timing disk, said control arm having a first position in which it holds said second switch open against said spring bias, a setting arm pivotally mounted coaxially with said control arm and being spring biased to a first position adjacent to said first position of said control arm, means to rotate said setting arm through one of a plurality of predetermined angles, said setting arm having a portion which bears against said ratchet member to release said ratchet and cause said control arm to rotate with respect to said timing disk when said setting arm is rotated, said ratchet member being spring-biased to mesh with the teeth of said timing disk and hold said control arm in the position on said timing disk to which it is moved by said setting arm after said setting arm is spring returned to its said first position, said timing disk being mounted to be rotated by said motor only when both said switches are closed to return said control arm to its said first position to reopen said second switch and stop said motor after an interval of time the length of which is determined by the angle through which said setting arm was rotated.

5. In an automatic washing machine, a wash tub, a pump connected to supply material to said tub, a motor connected to drive said pump, said motor being connected in an electrical circuit for supplying power thereto, a first normally open switch in series with said motor in said circuit, an automatic sequencing unit connected to close said first switch at a predetermined time, a second switch connected in series with said first switch in said electrical circuit, said second switch being biased to a closed position, and means operated by said motor only when both said switches are closed to open said second switch after a predetermined number of revolutions of said motor and said pump.

6. In a washing machine, a wash tub, a pump connected to supply material to said tub, a motor connected to drive said pump, said motor also being connected to drive a timing disk, an electrical circuit for supplying power to said motor, a switch connected in series with said motor in said circuit, said switch being biased to a closed position, a control arm pivotally mounted for rotation about the axis of said disk, said arm having a first position in which it holds said switch open against said bias, a round setting dial having a plurality of finger holes uniformly spaced near the outer edge thereof, a stop for said dial, said dial being mounted for rotation through an angle the size of which is determined by the hole selected by an operator to rotate said dial, means responsive to rotation of said dial to move said control arm into a second position relative to said timing disk to permit said switch to close, said second position differing from said first position by an angle determined by the angle through which said dial was rotated, said motor operating only when said switch is closed to drive said pump and to rotate said timing disk to return said control arm to said first position to open said switch and stop said motor after an interval of time the length of which is determined by the angle through which said setting arm was rotated.

7. Timing apparatus for controlling the length of time a pump is operated to dispense material from a source of said material to a receptacle in which said material is to be utilized comprising, pump means for pumping said material from said source to said receptacle, an electrical motor connected to drive said pump when and only when said motor is operating, a timing disc also connected to be rotated by said motor, an electrical circuit for supplying power to drive said motor, a switch connected in series with said motor in said circuit, said switch being biased to a closed position, a control arm pivotally mounted for rotation concentrically with said timing disc, said control arm having a first normal rest position in which it holds said switch open against said bias to prevent operation of said motor and pump, manually operated means to rotate said control arm through any one of a plurality of angles to a second position from which said control arm is returned by the operation of said motor driving said disc until said control arm again reaches said first position to open said switch and stop the operation of said motor and pump after a predetermined interval of time the magnitude of which is determined by the angle through which said control arm was rotated.

8. A metering and dispensing control system comprising a pump having a housing formed with an inlet and an outlet, rotary displacement means rotatable in said housing to meter material to be dispensed from said inlet to said outlet in an amount which is a function of the number of revolutions of said rotary displacement means, driving means for rotatably driving said rotary displacement means, timing means corotatably connected with said driving means, and presettable control means operatively interconnected with said timing means for presettably adjusting a time period of operation of said drive means to correspond to the amount of material to be dispensed.

9. A metering and dispensing control system as defined in claim 8, said driving means comprising an electric motor, said timing means comprising a geared timing disk, said control means comprising a telephone-type dial having a control member and an actuating means for positioning said control member on said timing disk when a selected sector of said dial is angularly actuated corresponding to a quantity of material to be metered and dispensed, and circuit means for energizing said electric motor having a switch in control thereof and being actuated by said control member to stop operation of said electric motor when the preselected quantity of material to be metered and dispensed has been delivered.

References Cited in the file of this patent

UNITED STATES PATENTS

| | | |
|---|---|---|
| 2,003,739 | Clark | June 4, 1935 |
| 2,434,199 | Dyer | Jan. 6, 1948 |
| 2,475,503 | Holthouse et al. | July 5, 1949 |